United States Patent
Kuroda

(10) Patent No.: US 6,355,890 B1
(45) Date of Patent: Mar. 12, 2002

(54) BUTTON STRUCTURE FOR AN ELECTRONIC APPARATUS

(75) Inventor: Mitsuru Kuroda, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/491,161

(22) Filed: Jan. 26, 2000

(30) Foreign Application Priority Data

Jan. 26, 1999 (JP) ............................................. 11-017382

(51) Int. Cl.[7] .............................................. H01H 13/70
(52) U.S. Cl. ..................... 200/5 A; 200/512; 200/517; 200/345
(58) Field of Search ..................... 200/5 A, 511–517, 200/341, 345

(56) References Cited

U.S. PATENT DOCUMENTS

| | | | |
|---|---|---|---|
| 4,471,189 A | * 9/1984 | Bacon et al. | 200/159 B |
| 5,298,706 A | 3/1994 | English et al. | 200/5.7 |
| 5,340,956 A | * 8/1994 | Chen | 200/341 |
| 5,510,584 A | * 4/1996 | Norris | 200/5 A |
| 5,697,718 A | 12/1997 | Erler et al. | 400/714 |
| 6,023,033 A | * 2/2000 | Yagi et al. | 200/512 |
| 6,084,190 A | * 7/2000 | Kenmochi | 200/341 |

FOREIGN PATENT DOCUMENTS

| | | | |
|---|---|---|---|
| GB | 2321134 A | 7/1998 | H01H/13/70 |
| JP | 6-275169 | 9/1994 | H01H/13/70 |
| JP | 8-227632 | 9/1996 | H01H/13/14 |
| JP | 2741373 | 1/1998 | H01H/11/00 |
| JP | 10-188722 | 7/1998 | H01H/13/14 |

* cited by examiner

Primary Examiner—Michael Friedhofer
(74) Attorney, Agent, or Firm—Scully, Scott, Murphy & Presser

(57) ABSTRACT

A button structure for an electronic apparatus includes buttons each facing a particular switch device arranged on a printed circuit board with the intermediary of a respective Belleville spring that snaps through when pressed. The button structure reduces an annoying click sound and minimizes a stroke required of each key top member to thereby promote easy operation. Key top members and a flat base with button bodies formed thereon are separable from each other in order to obviate wastes on a production line as far as possible while reducing cost. In addition, the button structure is easy to recycle.

11 Claims, 5 Drawing Sheets

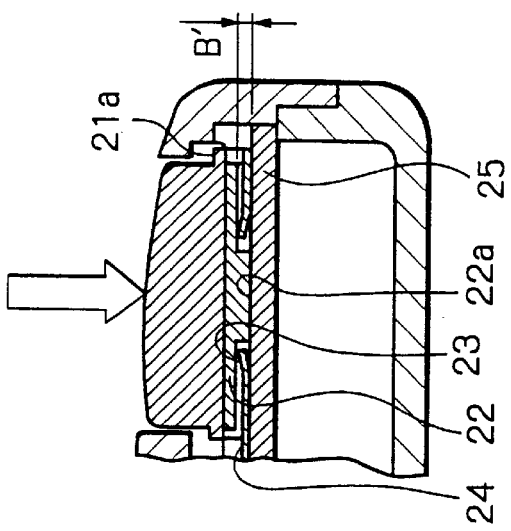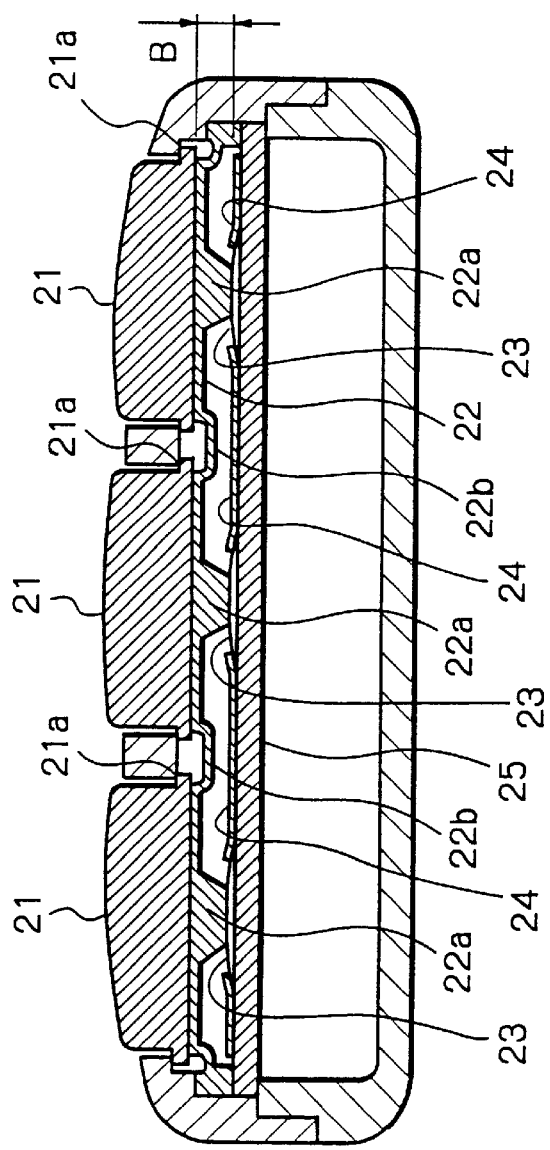

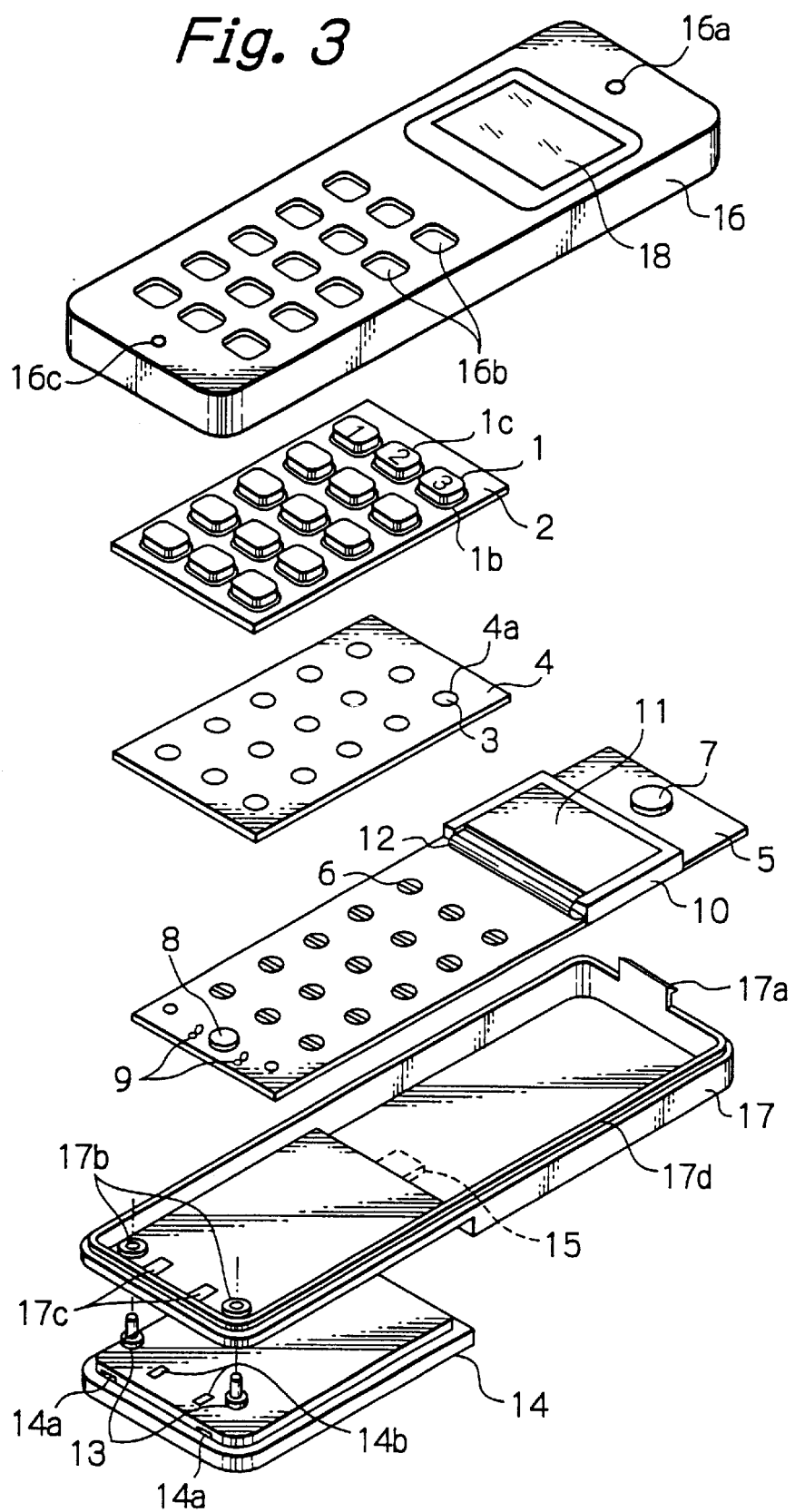

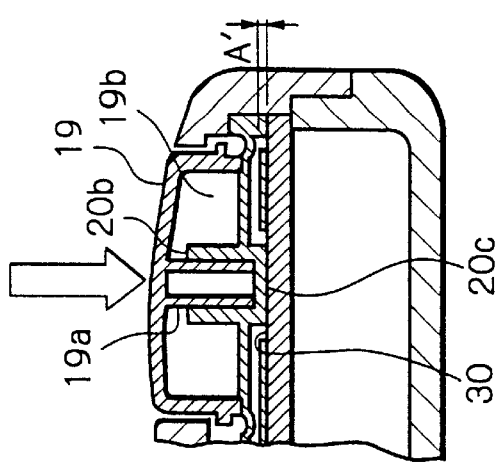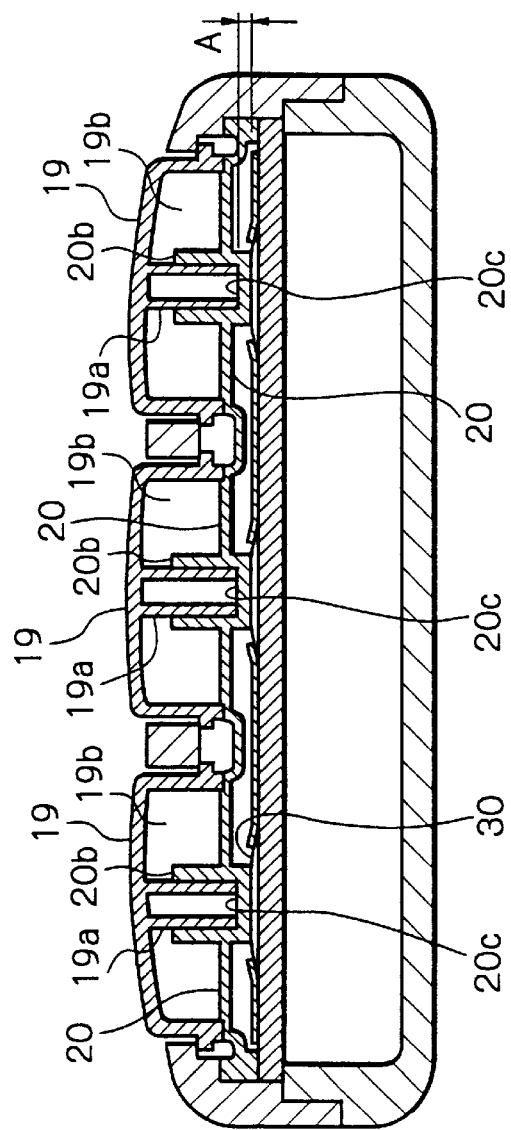

BUTTON STRUCTURE FOR AN ELECTRONIC APPARATUS

BACKGROUND OF THE INVENTION

The present invention relates to a button structure for a handy radio apparatus or similar electronic apparatus and more particularly to a button structure for an electronic apparatus including buttons each facing a particular switch device arranged on a printed circuit board with the intermediary of a respective Belleville spring which snaps through when pressed.

A conventional button structure for the above application includes key top members exposed to the outside of the casing of an electronic apparatus, so that the operator of the apparatus can directly touch the key top members. Button bodies are formed on a flat base disposed in the casing. The key top members and button bodies are so arranged as to face switch devices formed on a printed circuit board in the form of a wiring pattern with the intermediary of conductive Belleville springs.

The above conventional button structure has the following problems (1) through (4) left unsolved.

(1) An annoying click sound is produced in proportion to a pressure exerted on each key top member for turning on the associated switch device, i.e., repulsive energy resulting from the snap-through of the associated Belleville spring. Particularly, the click sound is undesirable when it comes to handy radio apparatuses or similar precision apparatuses.

(2) A long stroke is required of each key top member and obstructs easy operation.

(3) The key top members are adhered to the base. Therefore, when even one of the key top members is found defective by the last appearance test, all the key top members mounted on the base must be replaced together with the base. This reduces the yield of production and effects the cost. Particularly, at least the exposed portion of the key top members must be painted and printed in multiple colors, and a great number of steps are necessary for the key top members and base to be assembled and adhered together, aggravating losses ascribable to defective appearance.

(4) Because the key top members and base are formed of different materials, they are not separable or recyclable.

Technologies relating to the present invention are disclosed in, e.g., Japanese Patent Laid-Open Publication Nos. 10-188722, 6-275169 and 8-227632 and Japanese Patent No. 2,741,373.

SUMMARY OF THE INVENTION

It is therefore an object of the present invention to provide a button structure for an electronic apparatus capable of reducing the click sound and minimizing the required pressing stroke to thereby promote easy operation.

It is another object of the present invention to provide a button structure for an electronic apparatus allowing key top members and a base thereof separated from each other and thereby obviating wastes on a production line as far as possible to thereby reduce the cost and realize recycling.

A button structure for an electronic apparatus of the present invention includes a printed circuit board having switch devices arranged thereon, Belleville springs corresponding one-to-one to the switch devices and each snapping through when pressed, and buttons corresponding one-to-one to the switch devices. The buttons each include a button body formed on a single flat base and connected to button bodies of the other buttons by flexible portions, an actuating portion extending to the vicinity of corresponding one of the Belleville springs, and a key top member removably fitted on the button body.

BRIEF DESCRIPTION OF THE DRAWINGS

The above and other objects, features and advantages of the present invention will become more apparent from the following detailed description taken with the accompanying drawings in which:

FIG. 1A is a section showing a conventional button structure for an electronic apparatus;

FIG. 1B is a fragmentary section showing the structure of FIG. 1A in a condition wherein a button is pressed;

FIG. 3 is an exploded view of the apparatus shown in FIG. 2;

FIG. 5A is a section showing an alternative embodiment of the present invention; and FIG. 5B is a fragmentary section showing the alternative embodiment in a condition wherein a button is pressed.

DESCRIPTION OF THE PREFERRED EMBODIMENTS

Figure 2:
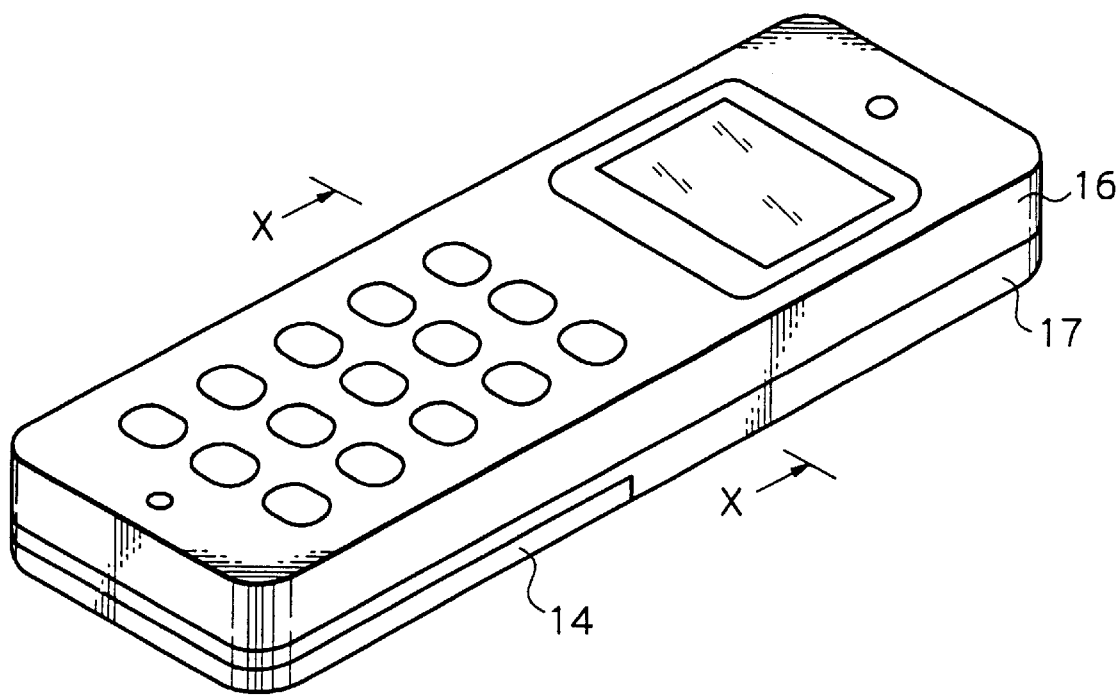
FIG. 2 is an external isometric view of an electronic apparatus to which the present invention is applicable.

To better understand the present invention, brief reference will be made to a conventional button structure for an electronic apparatus, shown in FIGS. 1A and 1B. As shown, a printed Circuit board 25 is disposed in a casing, not shown, while switch devices, not shown, are arranged on the circuit board 25. Buttons each face one of the switch devices with the intermediary of a respective Belleville spring 23 and include a key top member 21 formed of a hard material. The key top member 21 has a preselected thickness and has a generally oval shape as seen in a plan view. The key top member 21 is fitted in a hole formed in the front part of the casing from the inner periphery of the casing. At this instant, an annular flange 21a extending out from the key top member 21 is engaged with the edge of the above hole, preventing the member 21 from slipping out from the hole. Subsequently, the key top member 21 is adhered to a flat base 22 formed of a flexible material and positioned inside of the front part of the casing. Generally, the Belleville spring 23 is fitted in a hole formed in a support sheet 24 and adhered to the support sheet 24.

Particularly, thick contact portions 22a protrude downward from the base 22, and each faces one of the Belleville springs 23. When the key top member 21 overlying one of the contact portions 22a is pressed, the contact portion 22a causes the associated Belleville spring 23 to snap through while elastically deforming itself, thereby turning on the switch device underlying the spring 23. A thin flexible portion 22b surrounds the thick contact portion 22a in order to guarantee the movement of the contact portion 22a in the up-and-down direction.

The above conventional structure has the problems (1) through (4) discussed earlier. Particularly, as for the problem (1), while a click sound must be reduced by reducing the pressure to act on the key top member 21, the pressure should necessarily be increased due to extra energy necessary for the contact portion 22a to elastically deform. In addition, a deformation margin B–B' (see FIGS. 1A and 1B) must be provided in consideration of the elastic deformation of the contact portion 22, obstructing a thin configuration of the apparatus.

Preferred embodiments of the button structure in accordance with the present invention will be described hereinafter. FIG. 2 shows an electronic apparatus to which the present invention is applicable and implemented as a handy radio apparatus by way of example. FIG. 3 shows the internal arrangement of the radio apparatus. FIGS. 4A and 4B and FIGS. 5A and 5B each show a particular illustrative embodiment of the present invention, and each is a section as seen in a direction X—X of FIG. 2.

Figures 4A, 4B:
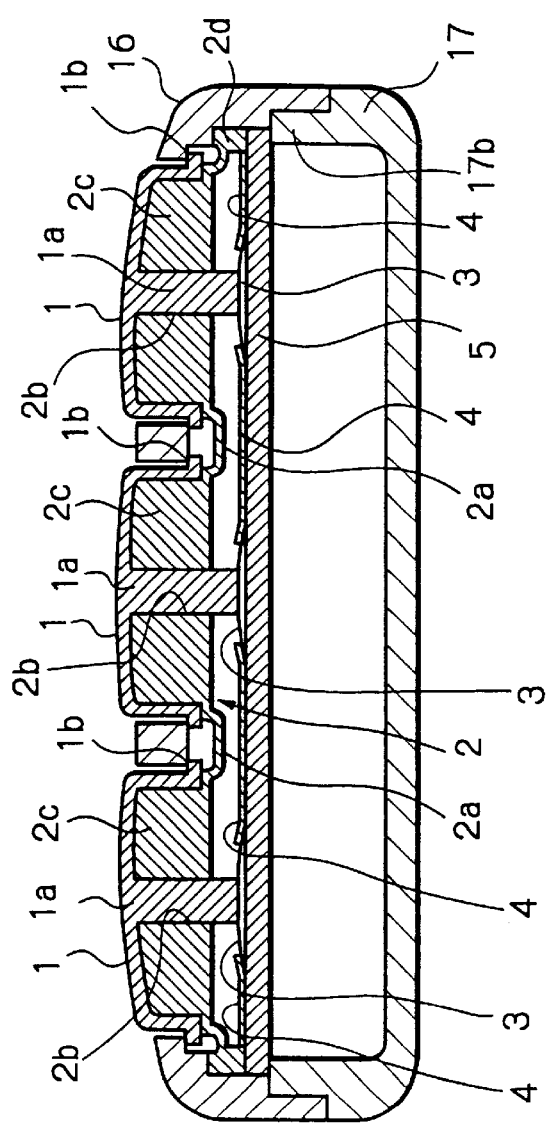
FIG. 4A is a section showing a button structure embodying the present invention.
FIG. 4B is a fragmentary section showing the illustrative embodiment in a condition wherein a button is pressed.

First, the general construction of the radio apparatus and a first preferred embodiment of the present invention will be described with reference to FIGS. 2, 3, 4A and 4B. As shown in FIG. 4A, a button structure embodying the present invention includes a plurality of button bodies 2c formed on a single flat base 2 and connected together by thin flexible portions 2a. Key top members 1 having, e.g., a bowl-like configuration each are removably fitted on one of the button bodies 2c. A columnar actuating portion 1a protrudes downward from each key top member 1 to the vicinity of a Belleville spring 3 which snaps through when pressed down.

In the illustrative embodiment, the key top members 1 are formed of polycarbonate, acrylic resin or similar synthetic resin or magnesium, aluminum or similar metal. The base 2 including the button bodies 2c and flexible portions 2a is entirely formed of natural rubber or soft, flexible synthetic resin, e.g., silicone rubber or an elastomer. The actuating portion 1a extends throughout a hole 2b formed in the center of the associated button body 2c.

As shown in FIGS. 2 and 3, the radio apparatus includes a casing made up of a front casing 16 and a rear casing 17 loaded with a battery 14. The Belleville springs 3 are formed of a conductive material. Generally, the Belleville springs 3 are fitted in holes 4a formed in a support sheet 4 in alignment with the button bodies 2c and are adhered to the support sheet 4. Switch deices 6 are arranged on a printed circuit board 5 in alignment with the Belleville springs 3 and connected to preselected circuitry formed on the circuit board 5.

As also shown in FIG. 3, an LCD (Liquid Crystal Display) 11 is mounted on the circuit board 5 via a frame 10 and has its terminals connected to a circuit arrangement provided on the circuit board 5 via a flexible printed circuit board 12. The rear casing 17 has a hook 17a at one end and holes 17b at the other end. After the front casing 16 has been engaged with the hook 17a, screws 13 are driven into the front casing 16 via the holes 17b in order to fasten the front casing 16 to the rear casing 17. A window 18 with a screen is formed in the front casing 16 in alignment with the LCD 11. Also, a speaker hole 16a and a microphone hole 16c are formed in the front casing 16 in alignment with a speaker 7 and a microphone 8, respectively, which are mounted on the circuit board 5.

Further, holes 16b are formed in the front casing 16 in alignment with the switch devices 6. The key top members 1 each are loosely fitted in one of the holes 16b. Specifically, in the illustrative embodiment, each key top member 1 includes a flange 1b abutting against the edge of the associated hole 16b inside of the front casing 16, so that the key top member 1 is prevented from slipping out of the hole 16b. A numeral or similar function 1c is printed on the top of the key top member 1 exposed to the outside via the hole 16b. The bowl-like portion of the key top member 1 is removably fitted on a projection-like portion included in the button body 2c.

A rib 17d is formed on the edges of the rear casing 17 expected to mate with the front casing 16. The rib 17d holds and thereby positions the edges 2d of the base 2, the edges of the support sheet 4 and the edges of the circuit board 5 between it and a stepped portion formed in the inner periphery of the edges of the front casing. The rear casing 17 additionally includes a lock piece 15 for locking the battery 14. The battery 14 is formed with holes 14a to be mounted to the rear casing 17 and terminals 14b. Terminals 9 are formed on the circuit board 5 and connected to the terminals 14b of the battery 14. Holes 17c are formed in the rear casing 17 and assigned to leads for connecting the terminals 14b of the battery 14 to the circuitry of the circuit board 5.

In the above configuration, each key top member 1 directly presses the underlying Belleville spring 3 with the tip of its actuating portion 1a. As a result, the spring 3 snaps through, i.e., suddenly elastically deforms when the pressure acting thereon exceeds a certain yield point. Therefore, only the reaction of the spring 3 acts on the key top member 1. This allows the pressure to act on the key top member 1 and therefore the resulting click sound to be reduced. The spring 3 in turn turns on the underlying switch device 6 due to its conductivity. Further, because the actuating portion 1a of the key top member 1 adjoins the spring 3, the key top member 1 can be pressed by a minimum of stroke and is therefore easy to operate.

Moreover, the key top members 1 are individually removable from the associated button bodies 2c. Therefore, even when the tops of some key top members 1 are found defective (e.g. defective painting or defective function printing) by the last appearance test on the production line, only the defective key top members 1 should be replaced at a repairing step. This successfully enhances yield on the production line and thereby reduces cost while eliminating the need for adhesion during assembly. In addition, because the key top members 1 and base 2 including the button bodies 2c are easy to separate, they can be readily recycled despite that they are formed of different materials.

An alternative embodiment of the present invention will be described with reference also made to FIGS. 5A and 5B. As shown, in this embodiment, the projection-like button body is absent in the bore of a key top member 19. Instead, a hollow cylindrical actuating portion 19a extends downward from the key top member 19 while a hollow cylindrical connecting portion 20b extends upward from a flat base 20. The connecting portion 20b corresponds in position to the button body of the previous embodiment and is also surrounded by a thin flexible portion. The connecting portion 20b has a preselected coupling margin in the lengthwise direction of the actuating portion 19a which allows the actuating portion 19a to be press fitted. Specifically, the connecting portion 20b has an inside diameter slightly smaller than the outside diameter of the actuating portion 19a in order to exert an adequate degree of elastic resistance at the time of press fitting. If a sufficient margin for press fitting is not available for mounting reasons, the key top member 19 and base 20 must be adhered to each other. However, removably mounting the key top member 19 to the base 20 is desirable from the recycling standpoint.

The tip of the actuating portion 19a adjoins a Belleville spring 30 with the intermediary of a thin bottom wall 20c included in the connecting portion 20b. It is therefore not necessary to take account of the elastic deformation of the bottom wall 20c, so that the click sound can be reduced as in the previous embodiment. It is to be noted that the thin bottom wall 20c is not essential and may be omitted at the design stage, in which case the actuating portion 19a will be extended to directly contact the Belleville spring 30.

FIGS. 5A and 5B respectively show a condition wherein the key top member 19 is not pressed and a condition wherein it is pressed. The operation of the illustrative embodiment will be described in comparison to the operation of the conventional structure of FIGS. 1A and 1B. As shown in FIG. 5A, the thin bottom wall 20c has a thickness A. As shown in FIG. 5B, when the key top member 19 is pressed, the bottom 20c is nipped between the actuating portion 19a and the Belleville spring 30 and has the thickness A reduced to A'. As a result, a stress ascribable to the pressure acting on the key top member 19, a reaction ascribable to the elastic deformation of the bottom 20c and the energy of the spring 30 itself are added up when the spring 30 snaps through. At this instant, the stroke of the key top member 19 is a difference between A and A', i.e., A–A'. By contrast, in the conventional structure, assuming that the deformable thick portion 22a of the base 22 has a thickness B, then the thickness must be reduced to B' by deformation in order to allow the operator to desirably feel the clicking action of the Belleville spring 23. The resulting stroke B–B' required of the key top member 21 is greater than the above stroke A–A'.

As stated above, in the illustrative embodiment, the bore of the key top member 19 and the portion of the base 20 corresponding to the button body of the previous embodiment are implemented as a simple space 19b. This is successful not only to achieve the same advantage as the previous embodiment as to the click sound, but also to reduce the weight of the button structure. As for the other advantages, too, this embodiment is comparable with the previous embodiment.

In summary, it will be seen that the present invention provides a button structure for an electronic apparatus having the following various unprecedented advantages. The button structure reduces a click sound and reduces a stroke required of a key top member to thereby promote easy operation. The key top member is simply press fitted in a flat base in contrast to a conventional key top member adhered to a button body formed on a flat base, so that the former is easier to assemble than the latter.

Further, even if some key top members are found defective as to printing, painting, plating, vapor deposition or similar secondary treatment by an appearance test after assembly, only the defective key top members should be replaced. The conventional structure requires the entire key sheet to be replaced when even a single key top member is defective. The structure of the present invention therefore enhances the yield of production and reduces cost.

Moreover, the structure of the present invention allows the key top members and base to be easily separated from each other despite that they are formed of different materials. This is desirable from the recycling standpoint.

Various modifications will become possible for those skilled in the art after receiving the teachings of the present disclosure without departing from the scope thereof.

What is claimed is:

1. A button structure for an electronic apparatus, comprising:

a printed circuit board having switch devices arranged thereon;

Belleville springs corresponding one-to-one to said switch devices and each snapping through when pressed, and buttons corresponding one-to-one to said switch devices;

said buttons each comprising:

a button body formed on a single flat base and connected to button bodies of the other buttons by flexible portions; and a key top member removably fitted on said button body, said key top member including a tubular actuating portion extending to the vicinity of said corresponding Belleville spring, said key top member having a bowl-like configuration including a flange engageable with an edge of a button hole formed in a front casing of the electronic apparatus at an inside of said front casing, said tubular actuating portion removably press fitted, with a pre-selected margin in a connecting portion positioned at the center of one of said corresponding button bodies, and said connecting portion is tubular with the inner surface of said connecting portion surrounding in close proximity the outer surface of said tubular actuating portion.

2. A button structure as claimed in claim 1, wherein said flexible portions each comprise a thin portion of said base surrounding a respective one of said button bodies.

3. A button structure as claimed in claim 2, wherein said base and said button bodies are implemented by a molding of either one of rubber and a flexible synthetic resin together with said flexible portions.

4. A button structure as claimed in claim 2, wherein said key top members are formed of either one of a hard synthetic resin and metal.

5. A button structure as claimed in claim 1, wherein said base and said button bodies are implemented by a molding of either one of rubber and a flexible synthetic resin together with said flexible portions.

6. A button structure as claimed in claim 5, wherein said key top members are formed of either one of a hard synthetic resin and metal.

7. A button structure as claimed in claim 5, wherein said tubular actuating portion extends through one of a bottom portion and a thin bottom wall of said connecting portion to the vicinity of one of said corresponding Belleville springs.

8. A button structure as claimed in claim 7, wherein said key top members are formed of either one of a hard synthetic resin and metal.

9. A button structure as claimed in claim 1, wherein said tubular actuating portion extends through one of a bottom portion and a thin bottom wall of said connecting portion to the vicinity of said corresponding Belleville springs.

10. A button structure as claimed in claim 9, wherein said key top members are formed of either one of a hard synthetic resin and metal.

11. A button structure as claimed in claim 1, wherein said key top members are formed of either one of a hard synthetic resin and metal.

* * * * *